UNITED STATES PATENT OFFICE.

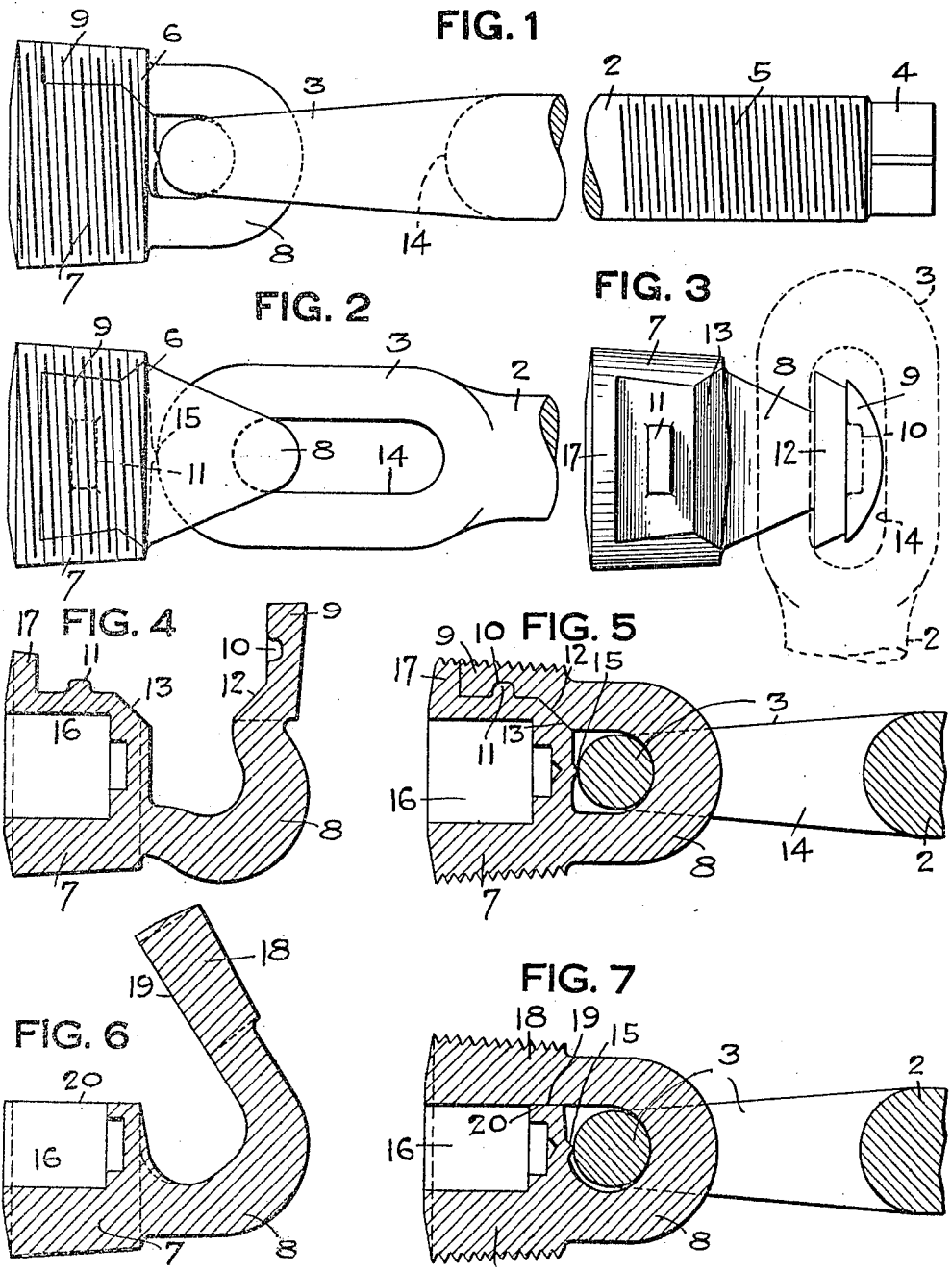

ROBERT J. McKAY AND THOMAS J. McKAY, OF PITTSBURGH, PENNSYLVANIA.

STAY-BOLT.

1,292,835.

Specification of Letters Patent. Patented Jan. 28, 1919.

Application filed May 5, 1915. Serial No. 26,131.

*To all whom it may concern:*

Be it known that we, ROBERT J. MCKAY and THOMAS J. MCKAY, citizens of the United States, and residents of Pittsburgh, in the county of Allegheny and State of Pennsylvania, have invented a new and useful Improvement in Stay-Bolts; and we do hereby declare the following to be a full, clear, and exact description thereof.

Our invention relates to stay-bolts.

The invention has relation more particularly to stay-bolts for uniting boiler-plates, such as the outside shell and fire-box shell of locomotives, and to the type illustrated and described in Letters Patent of the United States, No. 792,863, June 20, 1905, to George S. Thompson, the distinctive features of such stay-bolts being that the eye-head and eye-bolt are interlinked by their eye-loops so as to give the necessary amount of play, while, at the same time, independent rotary movement of the parts is prevented.

In the present invention, we form the eye-head with an extension on the loop-portion, which is welded to the body of the eye-head, said welded portion forming part of the threaded portion of the eye-head and when screwed into the opening in the boiler plate, there is no opportunity or chance for the metal separating along the line of weld.

In the accompanying drawing, Figure 1 is a view of our improved stay-bolt partly broken away; Fig. 2 is a view at right angles to Fig. 1, of a portion of a stay-bolt; Fig. 3 is a view of the eye-head inserted in the eye of the shank shown in dotted lines and before the welding operation on the head; Fig. 4 is a sectional view of the head before being welded; Fig. 5 is a sectional view after the welding; and Figs. 6 and 7 show modified forms of our invention.

The numeral 2 designates the shank or bolt portion, which is provided with the loop 3 at one end. At the opposite end, the shank is provided with the wrench-seat 4 and the threaded portion 5 for the purpose set forth and claimed in the application above referred to.

The eye-head 6 is formed of the body portion 7 with the loop 8 projecting therefrom, said loop having the extension 9. On the inner face of the extension 9 is the recess 10, which is adapted to engage the projection 11 on the body of the head. The extension 9 has the bevel-face 12, which engages the bevel-face 13 of the body 7.

Extension 9 is inserted through the opening 14 of the loop 3 of the shank, and in order to insert said extension, it is necessary to arrange the shank at right angles to the axial line of the eye-head, as shown in Fig. 3. When inserted, the extension 9 is then bent over to engage the body of the eye-head, the projection 11 entering the recess 10 whereupon the parts are welded electrically or otherwise so as to form a substantially integral structure. In Figs. 1 and 2, we have indicated the line of the weld, and after the weld has been made, the head is then threaded for engagement with the threaded opening in the boiler plate.

In order to take up any play between the end of the loop 3 of the shank and the inner end of the eye-head and prevent longitudinal movement of the one with reference to the other, we provide the projection 15, which is described and claimed in connection with the application above referred to.

The head 7 has the usual angular recess 16 to receive the tool for screwing the stay-bolt in position. It will be apparent that when the stay-bolt is screwed into position, there is no chance of the welded joint separating and there is no strain on said welded portion.

We prefer to have the outer end of the eye-head with the projecting portion 17 so that the extension 9 will bear against said projecting portion and so increase the area of the weld.

In Figs. 6 and 7, we have illustrated modified forms of our invention in which the extension 18 on the loop has a straight bearing face 19, which engages straight face 20 of the body of the eye-head, said extension 18 being welded electrically or otherwise to the body of said eye-head.

What we claim is:

1. A stay-bolt comprising a shank having a loop, an eye-head having a loop, and an extension on the loop of said eye-head welded to the part of the body of said eye-head which is adapted to be secured in the boiler plate.

2. A stay-bolt comprising a shank having a loop, an eye-head having a loop, and an extension on said eye-head having a recess therein, a projection on body of said eye-head adapted to enter said recess, and said extension welded to body of said eye-head.

3. A stay-bolt comprising a shank having a loop, an eye-head having a loop engaging the loop of said shank, an extension on the loop of said eye-head welded to the body of said eye-head, and a projecting portion on the inner end of said eye-head against which the inner end of said extension on said loop abuts.

In testimony whereof, we the said ROBERT J. McKAY and THOMAS J. McKAY, have hereunto set our hands.

ROBERT J. McKAY.
THOMAS J. McKAY.

Witnesses:
ROBT. D. TOTTEN,
JOHN F. WILL.

Copies of this patent may be obtained for five cents each, by addressing the "Commissioner of Patents, Washington, D. C."